June 21, 1960     L. PÉRAS     2,941,541
RESILIENT PACKING RINGS FOR FLUIDS UNDER PRESSURE
Filed Sept. 16, 1957
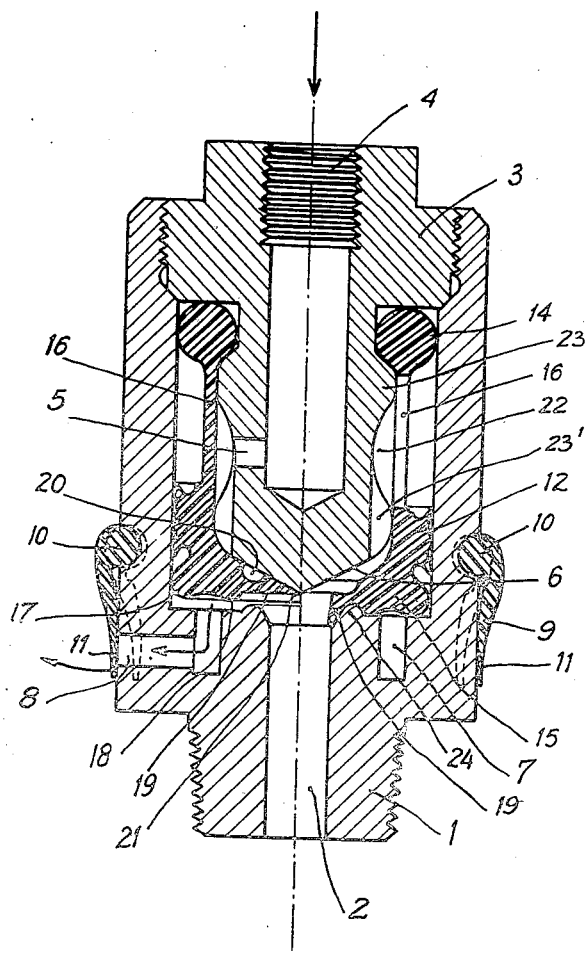

United States Patent Office 2,941,541
Patented June 21, 1960

2,941,541

RESILIENT PACKING RINGS FOR FLUIDS UNDER PRESSURE

Lucien Péras, Billancourt, France, assignor to Regie Nationale des Usines Renault, Billancourt, France Filed Sept. 16, 1957, Ser. No. 684,200

Claims priority, application France Oct. 18, 1956

3 Claims. (Cl. 137—102)

This invention relates to a modified form of construction of the valve or fluid flow control device in the applicant's co-pending application Serial Number 611,533, filed September 24, 1956, and relates more particularly to a modified construction of the valve for putting the chamber illustrated in Figures 13 to 15 of the said co-pending application under pressure or placing it in communication with the atmosphere.

The accompanying drawing illustrates in section a valve according to the invention on two planes passing through the longitudinal axis of the valve. The right-hand portion of the figure shows the valve in its extended position and wide open and the left-hand portion shows the valve retracted and practically closed.

Referring to the drawing, it will be seen that the device comprises a valve holder or body 1 provided with a nozzle 2 and having screwed into it an inner member 3 with an axial passage 4 and drilled with a suitable number of radial ports 5. The member 3 terminates inside the body 1 in a seat 6 of the shape illustrated in the drawing. At the bottom of the body 1 on a shoulder thereof as shown there is provided an annular groove 7 communicating with the atmosphere through the ports 8. These ports are covered by a tubular valve or sleeve 9 outside the body 1. Said sleeve 9 comprises at one end a ring 10 housed in a groove in the body 1, and at the other end a lip 11 which covers the ports 8. The sleeve 9 is shaped in such a manner as to have a certain resilient tension once it is in position on the body 1. (See the position in dotted lines in the drawing.)

Inside the body of the valve 1 there is arranged a valve element 12 of resilient material in the form of a cylindrical sleeve. The base or bottom portion of this valve element consists of a ring 14 connected to the end 15 by resilient lamellae 16, numbering four for example, the purpose of which will be explained below. The end 15 of the valve comprises two beads 17 and 18 and a circular lip 19 movable about the circular groove 20 which acts as a hinge. An aperture 21 is provided in the centre of the end 15 as shown in the figure. This valve is held in the body 1 by its toroidal peripheral edge portion 14 which is wedged, between said member 3, a bead 23 on said member and the inner wall of the body 1. The extent of compression on portion 14 is controlled by tightening member 3. A second bead 23' on the member 3 provided with notches permits the guiding of the end 15 of the sleeve 12 in its displacement, in co-operation with the bead 17, in the aperture of the nozzle 2. A neck 22 on the member 3 enables the lamellae 16 to bend in when the valve element is compressed. The latter is applied against the bead 24 on the body 1 which forms a valve seat.

The operation of the fluid flow control device is as follows:

The fluid under pressure reaches the valve through the passage 4 and the nozzle or passageway 2 of the valve body 1 is connected to a pneumatic apparatus, not shown, to which the valve is connected.

When fluid under pressure enters the passage 4, the fluid enters the interior of the body 1 through the ports 5 and exerts a pressure on the sleeve 12 and on the upper face of the end 15 of the sleeve 12 which it urges against the bead 24 on the body 1 and against the shoulder thereof which forms a seat. As the pressure continues to be exerted, the lips 19 bend outwardly (right-hand portion of the figure), thus enlarging the aperture or orifice 21 which allows the fluid to pass towards the passageway 2 and the pneumatic apparatus has fluids applied thereto under controlled pressure. It will be seen that in this position, the sealing off from the outside is effectively afforded by the beads 24, 17 and 18 as well as by the ring 14.

When the pressure of the fluid contained inside the body 1 drops the end 15 of the valve is restored, by the resilient tension of the lamellae 16, to the seat 6 of the member 3. The compressed gases in the passageway 2 then escape to the atmosphere through the groove 7, the ports 8, raising the lips 11 of the outer sleeve 9.

What is claimed is:

1. A fluid flow control device comprising, in combination, a tubular body member having an inner wall defining an axial bore extending therein a selected length less than the overall length of said member and having a first axial fluid passageway of lesser diameter than said bore extending therethrough and providing communication with said bore, said body member having a shoulder defining a valve seat between said first passageway and the bore, said shoulder having an annular recess disposed circumferentially of said first passageway and radially spaced therefrom, said body member having radial ports providing communication between the exterior thereof and said annular recess, an inner member disposed extending axially in said bore spaced from said seat and radially spaced from the inner wall of said body member and disposed closing said bore at an end thereof opposite to said first passageway thereby forming a chamber in conjunction with the body member, said inner member having a second passageway extending longitudinally therein a distance less than the overall length of said inner member and having radial ports providing communication between said second fluid passageway and said chamber, a yieldable sleeve valve element disposed between said body member and said inner member with said inner member extending axially therein with the radial ports thereof being disposed internally of said valve element, and the valve element having an end portion in fluid-tight contact with the inner wall of said bore and normally seated in intimate fluid-tight contact with a corresponding end portion of said inner member and axially spaced from said seat in the absence of a predetermined fluid pressure in said second passageway, said valve element having elongated, angularly spaced body portions of a stretchable material normally holding the end portion of said valve element in intimate seated contact with the corresponding end portion of said inner member, said end portion of said valve element having an orifice registering with said first passageway, whereby when a predetermined differential fluid pressure in the second passageway is greater the fluid pressure stretches the valve element elongated portions variably in response to differential pressure changes and unseats it from the inner member end portion and seats it on said shoulder closing said annular recess so that fluid flows controllably through said orifice and through said first passageway and when the fluid pressure in said first passageway exceeds that in said second passageway the sleeve valve element body portions contract and thereby the end portion is seated against said inner member end portion and fluid flows through said body member annular recess and out of said radial ports exteriorly of said body member, and means for allowing fluid flow through said last-mentioned radial ports toward the exterior of said body member only.

2. A fluid flow control device according to claim 1, in which said last-mentioned means comprises an annular, yieldable element disposed peripherally on said body member, said last-mentioned element having an end portion semi-circular in section and having an annular lip portion integral with said end portion and extending axially of the body member overlying said radial ports in the body member and closing them.

3. A fluid flow control device comprising, in combination, a tubular body member having an inner wall defining an axial bore extending therein a selected length less than the overall length of said member and having a first axial fluid passageway of lesser diameter than said bore extending therethrough and providing communication with said bore, said body member having a shoulder defining a valve seat between said first passageway and the bore, said shoulder having an annular recess disposed circumferentially of said first passageway and radially spaced therefrom, said body member having radial ports providing communication between the exterior thereof and said annular recess, an inner member disposed extending axially in said bore spaced from said seat and radially spaced from the inner wall of said body member and disposed closing said bore at an end thereof opposite to said first passageway thereby forming a chamber in conjunction with the body member, said inner member having a second passageway extending longitudinally therein a distance less than the overall length of said inner member and having radial ports providing communication between said second fluid passageway and said chamber, a yieldable sleeve valve element disposed between said body member and said inner member with said inner member extending axially therein with the radial ports thereof being disposed internally of said valve element, and the valve element having an end portion in fluid-tight contact with the inner wall of said bore and normally seated in intimate fluid-tight contact with a corresponding end portion of said inner member and axially spaced from said seat in the absence of a predetermined fluid pressure in said second passageway, said valve element having elongated, angularly spaced body portions of a stretchable material normally holding the end of said valve in intimate seated contact with the corresponding end portion of said inner member, said end portion of said valve element having an orifice registering with said first passageway and having outer surfaces axially guided on said bore inner wall, whereby when a predetermined differential fluid pressure in the second passageway is greater the fluid pressure stretches the valve element elongated portions variably in response to differential pressure changes and unseats it from the inner member end portion and seats it on said shoulder closing said annular recess so that fluid flows controllably through said orifice and through said first passageway and when the fluid pressure in said first passageway exceeds that in said second passageway the sleeve valve element body portions contract and thereby the end portion is seated against said inner member end portion and fluid flows through said body member annular recess and out of said radial ports exteriorly of said body member, and means for allowing fluid flow through said last-mentioned radial ports toward the exterior of said body member only.

References Cited in the file of this patent
UNITED STATES PATENTS

| | | |
|---|---|---|
| 1,854,518 | Little | Apr. 19, 1932 |
| 2,576,894 | Van Rast | Nov. 27, 1951 |
| 2,646,063 | Hayes | July 21, 1953 |
| 2,663,309 | Filliung | Dec. 22, 1953 |
| 2,702,044 | Johnston | Feb. 15, 1955 |